(12) United States Patent
Schäfer et al.

(10) Patent No.: US 7,099,583 B2
(45) Date of Patent: Aug. 29, 2006

(54) OPTICAL CROSS-CONNECT

(75) Inventors: Udo Schäfer, Esslingen (DE); Thomas Diehl, Leonberg (DE); Hermann Zoll, Markgröningen (DE)

(73) Assignee: Alcatel, Paris (FR)

( * ) Notice: Subject to any disclaimer, the term of this patent is extended or adjusted under 35 U.S.C. 154(b) by 655 days.

(21) Appl. No.: 10/101,958

(22) Filed: Mar. 21, 2002

(65) Prior Publication Data

US 2002/0149815 A1   Oct. 17, 2002

(30) Foreign Application Priority Data

Apr. 12, 2001 (DE) ................................ 101 18 295

(51) Int. Cl.
*H04J 14/00* (2006.01)
(52) U.S. Cl. .................. 398/56; 398/10; 398/12; 398/17; 398/19; 398/45; 398/46; 398/50; 398/55; 398/57; 398/48; 398/49; 398/79; 398/83; 385/16; 385/17; 385/18; 385/24; 370/370; 370/380; 370/387
(58) Field of Classification Search ............ 398/12, 398/19, 50, 55–57, 48–49, 79, 83, 10, 17, 398/45, 46; 385/17, 16, 18, 24; 370/370, 370/380, 387
See application file for complete search history.

(56) References Cited

U.S. PATENT DOCUMENTS

| | | | | |
|---|---|---|---|---|
| 4,829,512 A | * | 5/1989 | Nakai et al. | 370/224 |
| 5,091,905 A | * | 2/1992 | Amada | 370/415 |
| 5,303,077 A | * | 4/1994 | Bottle et al. | 398/46 |
| 5,303,078 A | * | 4/1994 | Brackett et al. | 398/51 |
| 5,457,556 A | * | 10/1995 | Shiragaki | 398/50 |
| 5,475,679 A | * | 12/1995 | Munter | 370/395.4 |
| 5,815,489 A | * | 9/1998 | Takatori et al. | 370/217 |
| 6,185,021 B1 | * | 2/2001 | Fatehi et al. | 398/9 |
| 6,317,230 B1 | * | 11/2001 | Kitajima et al. | 398/2 |
| 6,404,940 B1 | * | 6/2002 | Tsuyama et al. | 385/17 |
| 6,512,612 B1 | * | 1/2003 | Fatehi et al. | 398/49 |
| 6,532,089 B1 | * | 3/2003 | Asahi | 398/82 |
| 6,535,313 B1 | * | 3/2003 | Fatehi et al. | 398/101 |
| 6,600,849 B1 | * | 7/2003 | Ducellier et al. | 385/17 |
| 6,704,508 B1 | * | 3/2004 | Asahi | 398/30 |
| 6,829,436 B1 | * | 12/2004 | Koh et al. | 398/56 |
| 2001/0043603 A1 | * | 11/2001 | Yu | 370/393 |
| 2003/0043430 A1 | * | 3/2003 | Handelman | 359/128 |
| 2003/0194236 A1 | * | 10/2003 | Kim et al. | 398/50 |
| 2004/0090236 A1 | * | 5/2004 | Kunimatsu et al. | 324/537 |
| 2004/0208547 A1 | * | 10/2004 | Sabat et al. | 398/50 |

* cited by examiner

*Primary Examiner*—Hanh Phan
(74) *Attorney, Agent, or Firm*—Sughrue Mion, PLLC

(57) ABSTRACT

A bit-rate-transparent electrical space-division switching matrix is employed in an optical cross-connect and the input/output stage is constructed from simple, broadband optical receivers and transmitters. Since the switching matrix operates in unclocked manner, i.e. its switching function is not based on internal bit timing and frame timing, arbitrary signals can be switched though transparently at almost any bit rate, independently of the protocol-type being used. The inputs and outputs likewise operate fully independently of bit rate and protocol, since they only implement an O/E conversion or O/E conversion. By virtue of this structure, a simply constructed but extremely powerful optical cross-connect is created that can be employed equally for all types of optical signals within the stipulated wavelength-range. As a result, connections can be switched on the physical layer of an optical network, whereby the optical network can be utilised equally by various services with different transmission protocols.

11 Claims, 3 Drawing Sheets

OPTICAL CROSS-CONNECT

FIELD OF THE INVENTION

The invention relates to an optical cross-connect for switching optical communications signals on the physical layer in an optical transport network.

BACKGROUND OF THE INVENTION

For the transmission of data in transport networks, nowadays systems are mainly employed that operate in accordance with the recommendations of ITU-T for SDH (Synchronous Digital Hierarchy) and SONET (Synchronous Optical Network). In these systems, payload-data signals to be transmitted are packeted into multiplex units and interleaved in accordance with a multiplex rule to form a time-division-multiplexed communications signal. This is then transmitted as an optical communications signal via optical fibers of the network, whereby, in interposed network elements of the transport network, the communications signals are disassembled into the individual multiplex units contained therein and can be interleaved again in a new configuration. Connections in an SDH-based or SONET-based transport network are switched in this way. An overview of these systems is presented, for example, in the article entitled "SONET 101" produced by Nortel Networks.

In addition, optical networks are also increasingly finding application in which wavelength-multiplexed optical communications signals are transmitted. Such wavelength-multiplexed signals consist of several optical channels, which are each represented by one wavelength. As a result, it is possible for several optical signals to be transmitted in parallel via a single optical waveguide. For such optical networks, network elements are required that are capable of decoupling individual wavelengths from and inserting them into wavelength-multiplexed communications signal (add/drop multiplexers). In addition, network elements are required that are able to disassemble such wavelength-multiplexed communications signals into the individual wavelengths contained therein and multiplex them again in a new configuration, in order to switch connections in the optical network (cross-connects). The realization of the network elements that have been described is technically very elaborate, and the development of these devices is currently still in its initial stages. A standard for the optical channels is currently still being developed. For instance, a new multiplex hierarchy with the designation "optical channel (OCh)" is currently being discussed. This new multiplex hierarchy is intended to have multiplex levels with bit rates of 2.66 Gbit/sec and also multiples thereof (factors of four), namely 10.7x Gbit/sec and 43.x Gbit/sec, and is provided for optical transmission of information using wavelength-division multiplexing (WDM).

Furthermore, so-called optical cross-connects are currently being developed which are intended to switch optical communications signals of arbitrary format such as SONET, ATM, IP. They contain a central space-division switching matrix which is intended to be transparent in respect of the communications signals to be switched. An example of such an optical cross-connect is specified in the article entitled "Cost Effective Optical Networks: The Role of Optical Cross-Connects" by Charles A. Brackett. This optical cross-connect operates with a SONET-based, clocked electrical space-division switching matrix which operates with the frame timing of OC-48. Full transparency in respect of non-SONET-based communications signals is therefore not guaranteed.

A further example is the 20000 Series wavelength router produced by Monterey. In a brochure relating to this product which has been published on the Internet it is specified that said router consists of a subsystem designated as a "switch core" and of I/O cards that support OC-48/STM-16 signals and that are connected to the switch core via short-range optical interfaces (Ultra-Short-Reach-Optics™). The switch core has a switching capacity of 256 OC-48 or 64 OC-192 equivalents. Consequently, it is likewise based on the frame-timing rate of SONET and is therefore not fully transparent in respect of all signal-types.

One aspect of the present invention comprises specifying an optical cross-connect that operates independently of bit rate and independently of protocol and additionally guarantees transmission functions for at least one protocol-type. A further aspect of the invention comprises specifying a method for bit-rate-independent and protocol-independent switching of optical communications signals.

SUMMARY OF THE INVENTION

The aspects of the invention are achieved by an optical cross-connect which has broadband optical inputs, optical outputs, a transparent space switching matrix (S) which is electrically connected on the input side to the optical inputs and on the output side to the optical outputs, and a monitoring device which is connected to at least two matrix ports in order to receive an electrical communications signal from the switching matrix, to monitor this communications signal for transmission errors and to switch the communications signal back to the switching matrix.

An advantage of the cross-connect according to the invention is that it permits a remotely controllable interconnection of optical communications signals of arbitrary signal format via a central network-management system.

Further advantages are that the cross-connect according to the invention affords cost-savings in production and operation. In particular, the input/output interfaces are extremely cost-effective by reason of their simple structure. In addition, the optical cross-connect can be employed extremely flexibly in all existing and future networks and is open to all existing protocol-types. Current semiconductor technology permits use up to bit rates of 20 Gbit/sec.

It is a particular advantage to connect a monitoring device that is adapted to a particular protocol-type to the switching matrix, so that signals of this protocol-type can be conducted from the switching matrix to the monitoring device and can be conducted back again from the latter to the switching matrix. As a result, a monitoring of communications signals of this protocol-type is made possible without impairing the transparency and functionality of the cross-connect. By virtue of the monitoring device, a protective function can be set up and a predetermined signal quality can be guaranteed for communications signals of this protocol-type. A particularly advantageous configuration of this monitoring device monitors the B1 byte and/or the J0 byte of SDH or SONET signals. As a result, the optical cross-connect can be integrated into existing SDH systems or SONET systems.

The cross-connect according to the invention can be employed in WDM networks together with a wavelength-division multiplexer. In this case it is advantageous that typical topics in the WDL layer such as wavelength allocation and wavelength conversion are decoupled from the switching function in an optical network.

BRIEF DESCRIPTION OF THE DRAWINGS

The invention will be elucidated in the following with reference to an exemplary embodiment on the basis of FIGS. 1–5. Shown are.

DETAILED DESCRIPTION OF THE INVENTION

Figure 1:
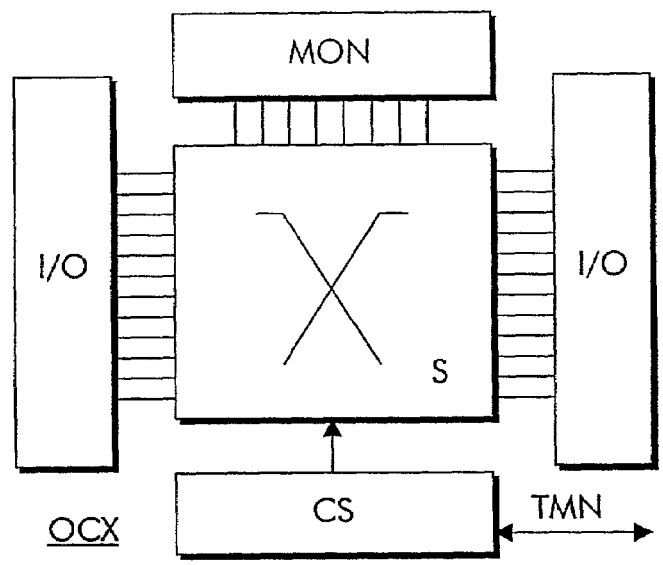
FIG. 1: a block diagram of the optical cross-connect according to the invention.

The optical cross-connect OCX represented in FIG. 1 has an electrical switching matrix S, an input/output stage I/O, a monitoring circuit MON and a controller CS. The switching matrix S has a number of ports, some of the ports being connected to the input/output stage I/O and the rest of the ports being connected to the monitoring circuit MON. In addition, the switching matrix S has a control input that is connected to the control device CS. The input/output stage comprises broadband optical inputs, of which are each provided with a single optical channel for the purpose of receiving an optical communications signal and also a number of optical outputs, of which are each provided with a single optical channel for the purpose of transmitting an optical communications signal.

The optical inputs each possess an O/E converter that converts an optical communications signal into an electrical communications signal. Analogously, the optical outputs possess an E/O converter which converts an electrical communications signal from the switching matrix S into an optical communications signal to be transmitted.

The switching matrix S is a transparent space-division switching matrix which is electrically connected on the input side to the optical inputs and on the output side to the optical outputs of the input/output stage I/O and which optionally interconnects the electrical communications signals from the optical inputs to the optical outputs under supervision of the control circuit CS. The switching matrix operates advantageously in unclocked manner. Similar unclocked switching matrices have hitherto been used in IP routers at a distinctly lower bit rate. Based on the latest Si/Ge-BiCMOS semiconductor technology, the switching matrix S can easily be designed for a maximum transmission rate of the order of 12 Gbit/sec. Laboratory experiments show that such a switching matrix comprising Si/Ge-BiCMOS semiconductors can even be employed up to a transmission rate of 20 Gbit/sec.

A fundamental idea of the invention is employing a bit-rate-transparent switching matrix in an optical cross-connect and in constructing the input/output stage from simple, broadband optical receivers and transmitters. A monitoring device is connected to the switching matrix, so that communications signals can be looped from the switching matrix to the monitoring device and back to the switching matrix, in order to implement transmission-system monitoring functions for communications signals of at least one predetermined protocol-type.

The switching matrix operates advantageously in unclocked manner, i.e., its switching function is not based on internal bit timing and frame timing. As a result, arbitrary signals can be switched through transparently at almost any bit rate, independently of the protocol-type being used. The inputs and outputs likewise operate fully independently of bit rate and protocol, since they only implement an O/E conversion or O/E conversion. For instance, very simple O/E converters comprising, in the simplest case, of a single photodiode are employed in the receivers. In addition, a bit-rate-independent signal processing (signal recovering) of the electrical signal can be performed, so that the resulting digital signal exhibits defined level-states with steep edge waveforms. This can be implemented with a Schmitt trigger, for example.

Correspondingly simple optical transmitting elements such as, for example, directly modulated broadband semiconductor lasers are employed in the transmitters. This takes account of the fact that the inputs and outputs are each provided for the purpose of receiving and transmitting, respectively, an optical communications signal with only a single optical channel within the wavelength-range of 1300 nm or 1500 nm, in which, however, in contrast with WDM systems, the exact wavelength plays no role. The function of this cross-connect is limited only by the maximum bit rate of approximately 12 or even 20 Gbit/sec which can still be switched through transparently by the switching matrix on the basis of the bandpass response which is characteristic of all semiconductors.

By virtue of this structure, a simply constructed but extremely powerful optical cross-connect is created that can be employed equally for all types of optical signals within the stipulated wavelength-range. As a result, connections can be switched on the physical layer of an optical network, whereby the optical network can be utilized equally by various services with different transmission protocols, such as IP, ATM or SDH, for example.

In FIG. 1, a monitoring device MON is shown which is connected to several ports of the switching matrix S. The task of the monitoring device is to implement a monitoring of errors in respect of communications signals of predetermined bit rate and protocol-type. Such an error-monitoring process will now be elucidated in more detail on the basis of the example provided by SDH signals.

In G.707 (1996), Chapter 9.2.2.4, one byte in the overhead of STM-N frames is reserved for a checksum. This byte is designated as the B1 byte; the checksum is designated by BIP-8 (Bit Interleaved Parity 8). The BIP-8 code is a checksum with even parity which is calculated over all the bits of the preceding frame after the scrambling thereof and is written to the B1 byte of the current frame before the latter is scrambled.

Such a BIP-X code is defined for a process for error-monitoring. It is calculated by the transmitting device over a predetermined part of the signal to be transmitted, specifically in such a way that the first bit of the code generates an even parity over all the first bits of all x-bit sequences of the signal part that is covered, the second bit of the code generates an even parity over all the second bits of all x-bit sequences and so on. Even parity means that the BIP-X bits are assigned in such a way that an even number of (logical) ones arises in the monitored partition of the signal. The monitored partition comprises all the bits in the same bit position within the x-bit sequences in the part of the signal that is covered, said part of the signal containing the BIP-X code itself.

In the exemplary embodiment, the monitoring device MON is designed in such a way that it calculates the BIP-8 code for each STM-N frame in a communications signal, reads out the BIP-8 code from the B1 byte of the following frame, and compares the two with one another. If a discrepancy is established, an error has occurred.

Now the monitoring device MON determines various parameters that characterize the quality of the transmission. In this connection, the errors that have occurred and that have been established on the basis of the BIP-8 calculation are determined and counted over predetermined time-intervals—typically 15 min and 24 h. Typical parameters for this purpose are: "background block errors", "errored seconds" and "severely errored seconds". An "errored second" is present if errors are present in a one-second interval and, however, less than 30% of the frames are defective. A "severely errored second" is present if more than 30% of the received frames are defective in a one-second interval. The parameters are added over 15 min and over 24 h. These values 19 represent monitoring data. They enable a check of the actual quality of the transmission and a protection circuit, inasmuch as a change-over to a redundant back-up line is undertaken if a predetermined transmission quality is fallen short of. This will be dealt with in more detail at a later point in connection with FIG. 3.

Additionally, or alternatively, it is advantageous also to implement in the monitoring device a second monitoring function for SDH signals. According to ITU-T G.707, Chapter 9.2.2.2, a seven-bit checksum CRC-7 (Cyclic Redundancy Check) is contained in the so-called J0 byte. The J0 bytes of 16 consecutive STM-N frames constitute one 16-byte frame, which contains the so-called Section Access Point Identifier (API). The API is constantly repeated, so that the receiving side can check whether the connection to the intended transmitter still exists. The first byte of the API contains, at bit positions 2 to 8, the checksum that is calculated from the preceding STM-N frame. The monitoring device MON reads the J0 byte from the STM-N frames of a communications signal. On the basis of the J0 byte, the continuity of the intended connection is checked and is tested by means of the checksum CRC-7 as to whether the preceding frame was error-free.

The monitoring device is connected to the switching matrix S via at least two ports. If a communications signal is now to be monitored, the communications signal is switched from the input/output stage I/O to the monitoring device MON via the switching matrix. The monitoring device performs the monitoring functions and conducts the unchanged communications signal back again to the switching matrix S. From the switching matrix S the communications signal is then switched to the stipulated output of the input/output stage I/O.

Consequently, a communications signal to be monitored is switched twice by the switching matrix S: a first time to the monitoring device, and a second time to the intended output of the cross-connect. As a result, a monitoring of the quality and the path of communications signals in the optical network is made possible without the transparency and functionality of the cross-connect being impaired.

Since the monitoring device performs protocol-specific functions, it has to be adapted to a particular protocol-type or to a group of different protocol-types that is able to distinguish it and handle it appropriately. The signal-monitoring described above may, of course, be employed advantageously not only in combination with a bit-rate-transparent electrical switching matrix, as in the present exemplary embodiment, but in combination with any type of switching matrix.

The control device CS controls the function of the switching matrix S, i.e., it specifies to the switching matrix S which matrix input is to be switched to which matrix output. The control device CS possesses a terminal TMN leading to a central management system that is not represented. This gate terminal (TMN) may, for example, operate on the basis of the SNMP (Simple Network Management Protocol) known from IP routers or even with the CORBA (Common Open Request Broker Architecture) specified by OMG (Object Management Group) or with another protocol that is suitable for network management. The central network-management system has an overall view of the entire network and can decide, on the basis of this information, which connections the individual cross-connects are to switch. This is then communicated to the control device CS of the cross-connect in question via the gate terminal. The control device also collects and stores the monitoring data of the monitoring circuit, so that said monitoring data can be called up on demand by the central management system via the gate terminal. Alarms can also be signaled to the central management system by this method. The gate terminal may, of course, also be a channel in one of the communications signals.

Figure 2:
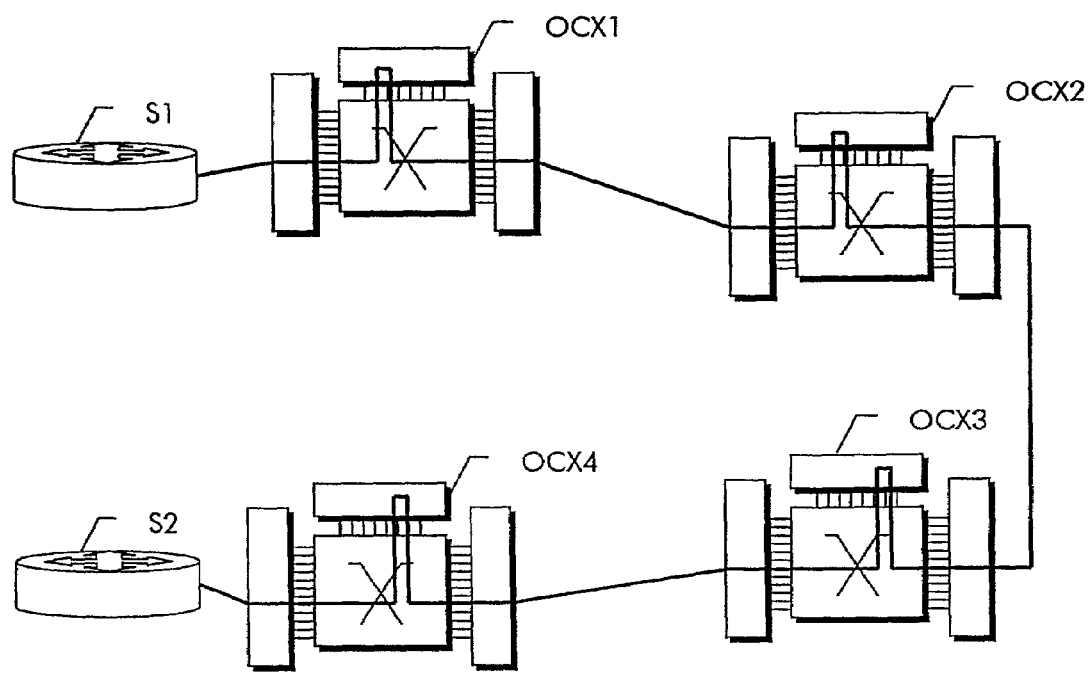
FIG. 2: a network with four optical cross-connects.

A portion of a network with four optical cross-connects OCX1–OCX4 is represented in FIG. 2. A transparent connection from a data source S1 to a data sink S2 is set up in the network by virtue of the cross-connects. The first cross-connect OCX1 receives a communications signal from the data source S1 at an input of its input/output stage. Via its switching matrix, it switches the communications signal to its monitoring device that performs a monitoring function for the communications signal and conducts it back to the switching matrix. The switching matrix then switches the communications signal to an output of the input/output stage that is connected via an optical fiber to an input of the second cross-connect OCX2.

In the same way, the communications signal is then switched from the second cross-connect OCX2 to the third cross-connect OCX3 and from there to the fourth cross-connect OCX4. The fourth cross-connect OCX4 then switches the communications signal to an output of its input/output stage I/O that is connected to the data sink S2. A monitoring, of the type described above, is implemented in all four cross-connects OCX1–OCX4. The data source and the data sink may, for example, each be a line multiplexer which generates from several tributary signals an SDH signal comprising STM-4 frames. The optical connection through the network has been described only in the direction from S1 to S2 but may, of course, also be bidirectional.

By virtue of the monitoring in the four optical cross-connects OCS1–OCS4, a predetermined quality of transmission is ensured. In case one of the cross-connects establishes that errors are occurring frequently and the quality of the transmission does not satisfy the preset requirements, an alarm message to the central network-management system can be generated, for example.

Figure 3:
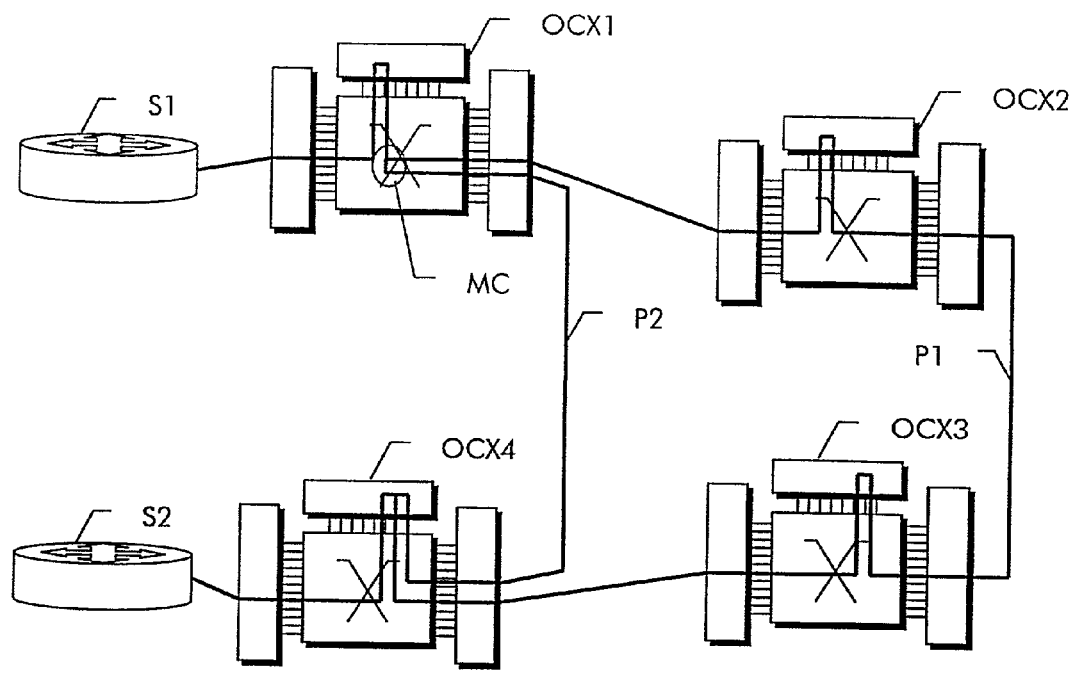
FIG. 3: the network from FIG. 2 with a protection circuit which has been set up.

In FIG. 3, the same network is shown as in FIG. 2. In addition to the connection P1 via the four cross-connects OCX1–OCX4, a direct connection P2 from OCX1 to OCX4 is switched as a protection circuit. This is effected by the communications signal in the switching matrix of the first cross-connect OCX1 being switched to OCX4, duplicated MC (Broadcast or Multicast) and parallel via a second output which is connected to an input of OCX4. The connection P1 is set as an active connection, whereas the connection P2 is available as a back-up in the event of errors. In the cross-connect OCX4 both signals that have been received in parallel are then switched from the switching matrix to the monitoring circuit, whereas only the active signal is forwarded to the output to S2. If the monitoring circuit in OCX4 establishes that the active communications signal of the connection P1 is subject to interference, a change-over is made to the back-up connection P2 automatically and without further interaction of the central network-management system. As a result, a rapid and effective protection of the connection for all types of communications signals is guaranteed on the optical level. Elaborate duplication of all the optical connections between all the network elements in the network can therefore be dispensed with. Consequently the available resources can be utilized considerably more effectively with the same protection than has been possible hitherto.

Figure 4:
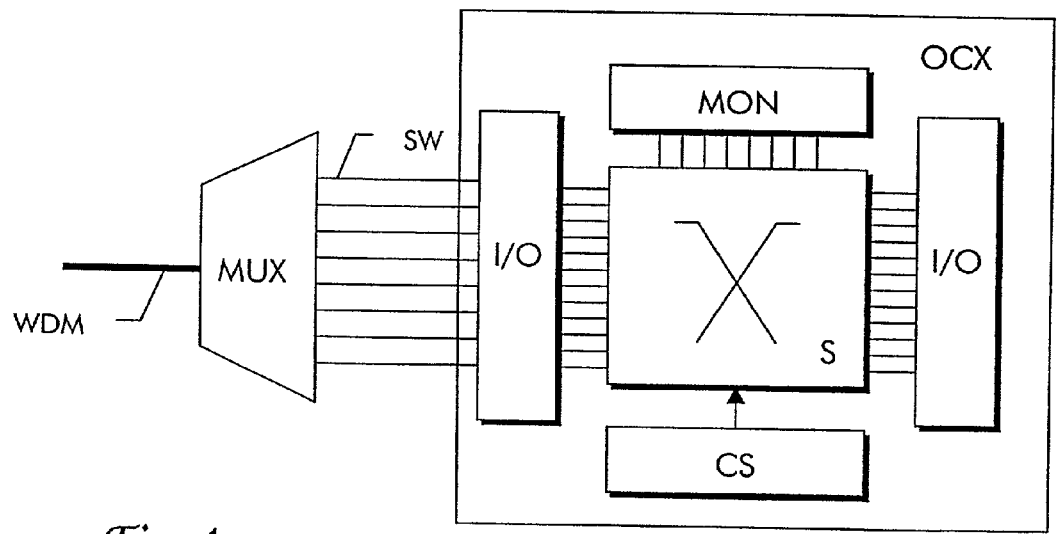
FIG. 4: the optical cross-connect according to the invention with an external wavelength-division multiplexer connected thereto
Figure 5:
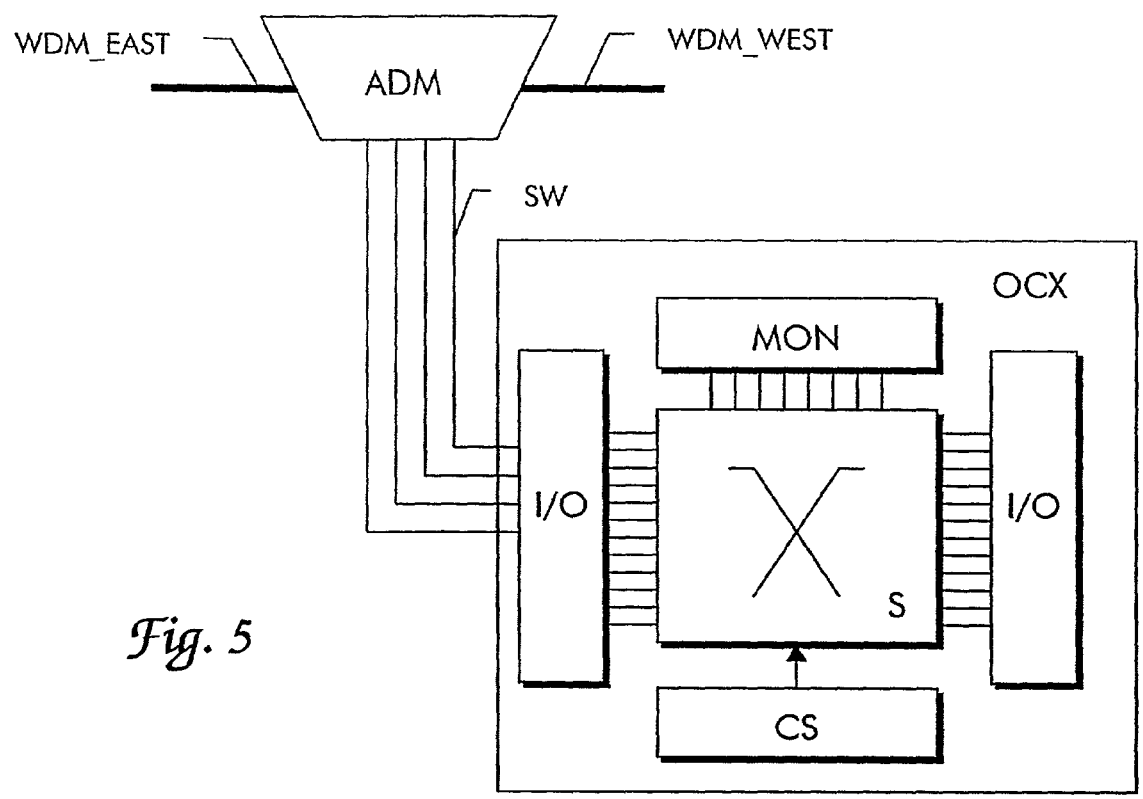
FIG. 5: the optical cross-connect according to the invention with an external add/drop multiplexer connected thereto.

The cross-connect according to the invention may also be employed in optical networks with wavelength-division multiplexing. To this end, several input/output ports of the cross-connect are connected to an optical wavelength-division multiplexer. This is represented in FIG. 4a. Eight input/output ports of the optical cross-connect OCX from FIG. 1 are connected to the tributary ports of a wavelength-division multiplexer MUX. The wavelength-division multiplexer integrates the eight optical signals SW received in parallel from the cross-connect using wavelength-division multiplexing so as to form an output signal WDM. In the opposite direction, it demultiplexes a received wavelength-multiplexed optical signal WDM into eight individual optical signals that it relays at the tributary ports to the optical cross-connect. The number of eight here has been chosen arbitrarily.

In this exemplary embodiment the wavelength-division multiplexer is a line multiplexer. But one or more ports of an add/drop multiplexer may also be connected to the optical cross-connect in exactly the same way. This is shown in FIG. 4b. The add/drop multiplexer ADM possesses an east port WDM_EAST and a west port WDM_WEST, in each case for wavelength-multiplexed signals. It is provided for use in a ring network, a wavelength-multiplexed signal being received at the east port and transmitted at the west port. For duplicated rings the ports may also be bidirectional, in order to enable simultaneous transmission in the clockwise direction and in the anticlockwise direction. The add/drop multiplexer is capable of taking individual optical channels (wavelengths) out of the wavelength-multiplexed signal and of outputting them at a tributary port (drop) or of inserting optical signals that have been received at a tributary port into the wavelength-multiplexed signal as new channels (add). In this exemplary embodiment, four tributary ports are connected to input/output ports of the optical cross-connect OCX.

What is claimed is:

1. An optical cross-connect for switching optical communications signals in an optical transport network on the physical layer, comprising:
    a number of broadband optical inputs, each for receiving an optical communications signal with a single optical channel, each optical input comprising an O/E converter for converting the optical communications signal received at the respective optical input into an electrical communications signal,
    a number of optical outputs, each for transmitting an optical communications signal with a single optical channel, each optical output comprising an E/O converter for converting an electrical communications signal into the optical communications signal to be transmitted,
    a transparent space switching matrix which is electrically connected on the input side to the optical inputs and on the output side to the optical outputs, for interconnection of the electrical communications signals from the optical inputs to the optical outputs, and
    a monitoring device, which is connected to at least two ports of the switching matrix in order to receive an electrical communications signal from the switching matrix to monitor the communications signal for transmission errors,
    wherein the electrical communications signal is switched along a path from one port of the switching matrix to the monitoring device, through the monitoring device and back to the switching matrix, and
    wherein the switching matrix operates in an unclocked manner to transparently switch signals of different types, the monitor is adapted to monitor signals of a predefined type, and the switching matrix is controlled such that only signals of the predefined type are switched to the monitor while signals of other types are switched transparently to their respective outputs.

2. The optical cross-connect according to claim 1, wherein the monitoring device is adapted for one or more predetermined protocol-types.

3. The optical cross-connect according to claim 2, wherein the monitoring device is adapted for SDH signals or SONET signals.

4. The optical cross-connect according to claim 3, wherein the monitoring device checks for errors by a checksum from the B1 byte and/or J0 byte contained in frame overheads of the communications signals.

5. The optical cross-connect according to claim 1, wherein the inputs and outputs are combined to form an input/output stage.

6. The optical cross-connect according to claim 1 with a control device for controlling the switching-states of the switching matrix.

7. The optical cross-connect according to claim 1, wherein the monitoring device is connected to an additional port of the switching matrix, wherein the additional port is coupled to a backup optical input.

8. A method for switching optical communications signals in an optical transport network on the physical layer, comprising the steps of:
    receiving a broadband optical communications signal with a single optical channel at one input,
    converting the received optical communications signal into an electrical communications signal by means of an O/E converter,
    switching the electrical communications signal from a transparent space-division switching matrix to a monitoring device,
    monitoring the electrical communications signal for transmission errors,
    feeding the electrical communications signal back to the switching matrix for the purpose of subsequent interconnection to one of several outputs,
    interconnecting the electrical communications signal by means of the switching matrix to one of the outputs,
    converting the electrical communications signal into an optical communications signal to be transmitted at a single optical channel using an E/O converter,
    transmitting the optical communications signal,
    wherein the switching matrix operates in an unclocked manner to transparently switch signals of different types, the monitor is adapted to monitor signals of a predefined type, and the switching matrix is controlled such that only signals of the predefined type are switched to the monitor while signals of other types are switched transparently to their respective outputs.

9. The optical switching method according to claim 8, wherein the electrical communications signal is monitored for one or more predetermined protocol-types.

10. The optical switching method according to claim 9, wherein the monitoring is adapted for SDH signals or SONET signals.

11. The optical switching method according to claim 10, wherein the monitoring comprises checking for errors by a checksum from the B1 byte and/or J0 byte contained in frame overheads of the communications signals.

* * * * *